US009446993B2

(12) United States Patent
Li et al.

(10) Patent No.: US 9,446,993 B2
(45) Date of Patent: Sep. 20, 2016

(54) METHOD OF PREPARING A SLOW RELEASE FERTILIZER

(71) Applicant: UPM-KYMMENE CORPORATION, Helsinki (FI)

(72) Inventors: Zhiyong Li, Jiangsu (CN); Yan Zhang, Shanghai (CN)

(73) Assignee: UPM-KYMMENE CORPORATION (FI)

( * ) Notice: Subject to any disclaimer, the term of this patent is extended or adjusted under 35 U.S.C. 154(b) by 0 days.

(21) Appl. No.: 14/430,696

(22) PCT Filed: Sep. 26, 2012

(86) PCT No.: PCT/CN2012/081966
§ 371 (c)(1),
(2) Date: Mar. 24, 2015

(87) PCT Pub. No.: WO2014/047793
PCT Pub. Date: Apr. 3, 2014

(65) Prior Publication Data
US 2015/0259261 A1    Sep. 17, 2015

(51) Int. Cl.
C05G 3/00 (2006.01)
C05C 9/00 (2006.01)
C08K 3/34 (2006.01)
C08K 5/06 (2006.01)
C08K 5/09 (2006.01)
C08K 5/12 (2006.01)
C09D 197/00 (2006.01)

(52) U.S. Cl.
CPC ............. *C05G 3/0029* (2013.01); *C05C 9/005* (2013.01); *C05G 3/0041* (2013.01); *C08K 3/346* (2013.01); *C08K 5/06* (2013.01); *C08K 5/09* (2013.01); *C08K 5/12* (2013.01); *C09D 197/005* (2013.01)

(58) Field of Classification Search
CPC .... C05G 3/0029; C05G 3/0041; C08K 5/09; C08K 5/12; C08K 3/346; C08K 5/06; C09D 197/005; C05C 9/005
See application file for complete search history.

(56) References Cited

U.S. PATENT DOCUMENTS 5,704,961 A    1/1998  Hudson

FOREIGN PATENT DOCUMENTS

| CN | 1164531 C | 9/2004 |
| CN | 101712583 A | 5/2010 |
| CN | 101759498 A | 6/2010 |
| WO | 2011005175 A1 | 1/2011 |
| WO | 2011055174 A1 | 5/2011 |

OTHER PUBLICATIONS

International Search Report mailed Jun. 27, 2013 relating to PCT/CN2012/081966 filed Sep. 26, 2012.

*Primary Examiner* — Jennifer A Smith
(74) *Attorney, Agent, or Firm* — Dinsmore & Shohl LLP

(57) ABSTRACT

Provided is a method for preparing slow release fertilizer with a coated surface. Furthermore, a formulation of the coating layer 1 comprises lignin, alkenylsuccinic anhydride, stearic acid, polyethylene glycol (PEG)-2000 and kaolin.

13 Claims, 2 Drawing Sheets

METHOD OF PREPARING A SLOW RELEASE FERTILIZER

CROSS REFERENCE TO RELATED APPLICATIONS

The present specification claims priority to International Patent Application No. PCT/CN2012/081966 filed Sep. 26, 2012 entitled "Method of Preparing a Slow Release Fertilizer," the entirety of which is incorporated by reference herein.

BACKGROUND

1. Field

The present specification relates to a method for preparing slow release fertilizer with a coated surface. Furthermore, the present specification relates a formulation of the coating layer.

2. Technical Background

Lots of effort has been expended in preparing slow release or controlled release fertilizer. The focus areas are reducing initial dosage and keeping constant levels of fertilizer for extended durations. Mechanisms include controlled water solubility of the material (by semi-permeable coatings, occlusion, or by inherent water insolubility of polymers, natural nitrogenous organics, protein materials, or other chemical forms), by slow hydrolysis of water-soluble compounds, and diffusion of materials through porous structure or by biodegradability of carriers. Polymer coated fertilizer has been commercialized in many countries.

Lignin is the second most abundant natural polymer in the world, and is a waste product of pulping mills. Lignin does not dissolve in water but partially or totally dissolves in some solvents, such as ethanol, methanol, hexane and so on. Lignin dissolved in organic solvents exhibits good film-forming properties. Therefore, it can be easily coated on the surface of fertilizer particles.

In the Chinese patent publication CN1164531, lignin is dissolved in water by first adding 5-10% sodium dodecyl benzene sulfonate, and then the slow-release fertilizer is produced by mixing the lignin solution and fertilizer or spraying the lignin solution onto the fertilizer. The final drying method is hot air drying.

It is clear in claim 1 of the Chinese patent publication CN1164531 that the coating materials are powders of ligno-cellulosic biomass, such as wood sawdust, wood residues, branches, agricultural residue and walnut shells. In these kinds of powder, lignin is not the main element.

The Chinese patent publication CN1164531 uses other adhesives to adhere the powders to the surface of fertilizer.

In the two patent applications WO 11055174 and WO11005175, two methods related to lignin are disclosed. One is directly mixes lignin and urea. The other is directed to a preparation of lignin reacted with urea at high temperature in an aqueous system.

SUMMARY

An object of the present specification is to provide a urea fertilizer having slow release properties and a method for preparing a slow-release fertilizer. The rate of nutrient release can be controlled by changing the formulation of the coating layer or the coating weight. This fertilizer is inexpensive and can be used for fertilizing crops, bushes, flowers and lawns.

A first aspect of the present application is to provide a method for preparing a slow-release fertilizer comprising the steps of:
a) dissolving lignin, alkenylsuccinic anhydride, stearic acid and PEG-2000 in a solvent heated to 50-100° C.;
b) forming a coating on the surface of urea granules using the solution obtained in step a) and drying;
c) immersing the coated granules obtained in step b) in alkenylsuccinic anhydride;
d) adsorbing kaolin onto the surface of the coated granules, wherein the coating materials are 20-80% of the total weight of the coated granules.

In an embodiment, the method for preparing a slow-release fertilizer comprising the steps of:
a) dissolving 30 to 70 parts by weight of lignin, 5 to 10 parts by weight of alkenylsuccinic anhydride, 5 to 15 parts by weight of stearic acid and 5 to 15 parts by weight of PEG-2000 in a solvent heated to 50-100° C.;
b) forming a coating on the surface of urea granules using the solution obtained in step a) and drying;
c) immersing the coated granules obtained in step b) in alkenylsuccinic anhydride to absorb 2 to 10 parts by weight of alkenylsuccinic anhydride;
d) adsorbing 2 to 10 parts by weight of kaolin onto the surface of the coated granules, wherein the coating materials are 20-80% of the total weight of the coated granules.

In an embodiment, the solvent is selected from 1,4-dioxane, tetrahydrofuran, N,N-dimethylformamide, ethanol, methanol, hexane, dimethylsulfoxide, 2-methoxyethanol or a mixture thereof.

In an embodiment, the lignin has a lignin content higher than 80% and a weight average molecular weight of more than 1500 g/mol.

In an embodiment, the solvent to lignin ratio by weight is from 3:1 to 7:1.

In an embodiment, the drying is done at a temperature in a range from 40° C. to the boiling point of the solvent.

In an embodiment, drying is done at 40-60° C. at a pressure of 10-101 kPa or drying is done with hot air of 40-60° C. with pressure of 1-7 bar.

In an embodiment, the alkenylsuccinic anhydride has a linear alkenyl chain of 14 to 20 carbon atoms.

In an embodiment, forming a coating on the surface of urea granules is achieved by immerging the urea granules in the solution obtained in step a) or by spraying the solution obtained in step a) on the surface of urea granules.

A second aspect of the present application is a formulation of the coating material that comprises 30 to 70% by weight of lignin compounds, 10-25% by weight of alkenylsuccinic anhydride, 5-20% by weight of stearic acid, 5-15% by weight of polyethylene glycol (PEG)-2000 and 2-15% by weight of kaolin, wherein all the weight percentages are based on the total weight of the coating material.

In an embodiment, the alkenylsuccinic anhydride has a linear alkenyl chain of 14 to 20 carbon atoms.

A third aspect of the present application s to provide a fertilizer obtained by the method of the present application.

DETAILED DESCRIPTION

Figure 1:
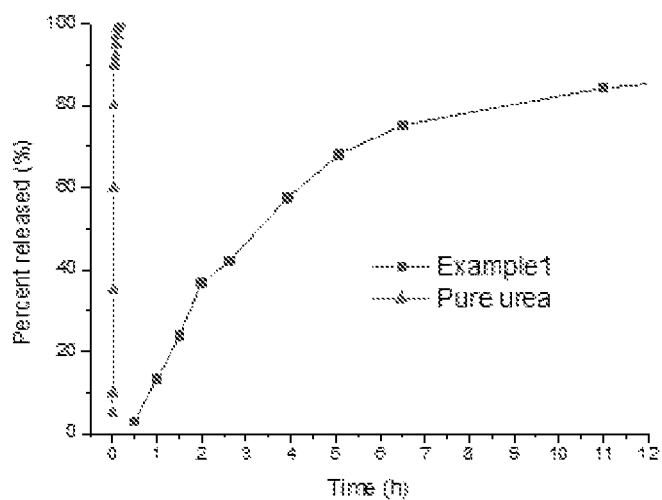
FIG. 1 shows the release profile of slow release fertilizer from example 1 compared to pure urea.

In the present application, the lignin could be in liquid phase by partially or completely dissolving the lignin in a selected organic solvents and controlling the viscosity, rheology property as well as film forming ability on the surface of urea, so no other adhesives are needed.

The lignin used in the present application is natural lignin with a lignin content higher than 80%. Lignin compounds used in the present specification can be any kind of lignin product having a lignin content higher than 80% and a weight average molecular weight of more than 1500 g/mol.

Lignin can be extracted from black liquor of a pulping process or from residues of biomass carbohydrate hydrolysis. Market alkaline lignin needs to be purified before being used for fertilizer. Market enzymatic hydrolysis lignin can be used directly as a raw material. Lignin from pulping with organic solvents, like ethanol, formic acid, acetic acid, 1-butanol, and so on, can also be used as a raw material.

Lignin exhibits different properties in different solutions. Lignin dissolved in organic solvents exhibits good film-forming properties, so no other binders are needed. The vacuum drying technique can reduce energy costs and recover organic solvents at the same time.

In the present application, solvents are used to dissolve lignin and other components of the coating material. Solvents in which lignin has good solubility, including 1,4-dioxane, tetrahydrofuran, N,N-dimethylformamide (DMF), ethanol, methanol, hexane, dimethylsulfoxide (DMSO), 2-methoxyethanol and so on can be used. In principle, all those solvents in which lignin dissolve but urea does not dissolve, are suitable for this application, such as, dimethylsulfoxide (DMSO), 2-methoxyethanol, 1,4-dioxane, tetrahydrofuran, N,N-dimethylformamide (DMF), ethanol, methanol, hexane, or a mixture thereof.

The common solvent to lignin ratio by weight should be from 3:1 to 7:1. It means that the concentration of lignin in solvent is 25-70%.

The drying method is drying at 40-60° C. at a pressure of 10-101 kPa or drying is done with hot air of 40-60° C. with a pressure of 1-7 bar, preferably 2-3 bar.

The urea granules are commercially available normal urea fertilizer. The diameter of the urea granule should range from 0.2 mm to 3.0 mm.

Spray coating: The coating solution is pressurized by air or a pressurizing pump, and then is fed to a spraying nozzle. The coating solution is sprayed onto the surface of the urea granules.

Immersion coating: The urea granules are put into a sieve, and then are put into the coating solution together with the sieve. After 3-5 seconds, the sieve is taken out, and then the urea granules are transferred to a shaking plate.

It is believed that the immersion coating has more advantages including better control over surface coverage in smoothness, thickness, and fewer defects. As a result, the controlled release kinetics (urea concentration at a particular time) will be quite different.

In principle, the higher coating weight will lead to slower release of urea.

Since urea is easily dissolved in water, direct fertilization of urea shows a fast but short-lived effect. The controlled release fertilizer can slowly release the urea to the soil, and keep the nutrient content at a certain level for a long time, consequently reducing the waste of urea and environmental pollution.

The temperature for dissolving lignin can vary between 20° C. and the boiling point of the solvent used for dissolving. In many embodiments, the temperature is not important and ambient temperature around 20° C. is appropriate. However, for example for ethanol, a temperature higher than ambient is better, but the temperature should always be lower than the boiling point of the solvent.

The release rate of fertilizer can be tailor made by coating with different amounts of lignin. The lignin coated products can also be mixed with other fertilizers with different releasing rates to achieve several types of targeted release control. This fertilizer is very inexpensive and can be used for fertilizing crops, bushes, flowers and lawns.

Evaluation of Nutrient Release Rate

The nutrient release rate of a prepared slow release fertilizer in water was compared with pure urea. About 0.2 g fertilizer was put into 1 liter of water at room temperature (20° C.). The content of urea in water was determined by high performance liquid chromatography (Agilent 1290 UHPLC. USA, column: Zorbax Rx-Sil, 3.0×100 mm, 1.8 μm).

EXAMPLES

It is appreciated that these examples are only illustrative and not intended to limit the scope of the embodiments and aspects described herein. The experimental methods in the following examples were performed under routine conditions, or as instructed by the manufacturers, unless otherwise specified. Unless specified otherwise, all of the percent and parts are based on weight.

Example 1

About 600 g of dioxane was weighed and heated to 50° C. With stirring, 20 g of ASA (Kemira Hydrores AS 2300, ASA with a linear alkenyl chain of 18 carbon atoms), 40 g of PEG-2000 (Produced by Sinopharm Chemical Reagent Co, Ltd.) and 60 g of stearic acid were added to 1,4-dioxane in sequence. About 200 g of purified kraft lignin (The crude kraft lignin was precipitated from black liquor of a kraft pulp mill by adjusting the pH of the black liquor to 2.0 with concentrated sulfuric acid (98%, w/w). The precipitated crude kraft lignin was filtered and washed with acidic water of pH 2.0, and then filtered by pressure filtration. The washing and pressure filtration was repeated again, and then the precipitate was spray-dried to get the purified kraft lignin) was added to the mixture and the mixture was heated to 80° C. After 20 minutes, the mixture was ready for use.

Urea granules (350 g of urea granules produced by Ruixing Group Co., Ltd) were put on a shaking plate (Model: S-101, Produced by Firstek Scientific Co., Ltd.). The previously prepared coating mixture (800 g) was sprayed on the surface of the urea granules by a pressure sprayer (Graco EasyMax WP™ Airless Paint Spray Unit). After the initial spraying, the granules were dried with hot air (of 40-60° C.) for about 30 seconds to remove the solvent and were re-coated by spraying. The spraying and drying were repeated three times. After the last spraying of the coating mixture, the granules, finally coated with 256 g of the dry matters of the coating mixture, were immerged in ASA (Kemira Hydrores AS 2300, ASA with a linear alkenyl chain of 18 carbon atoms) for 1-3 seconds to gain weight of 10 g of ASA, and than were put into kaolin powder to adsorb 20 g of kaolin powder. The coating materials were 45% by weight of the whole granules.

The coating materials mean the materials on the granules, i.e. ASA, PEG-2000, stearic acid, lignin and Kaolin powder.

The results of Example 1 are shown in FIG. 1. Pure urea totally dissolves in water with 6 minutes.

Example 2

About 300 g of tetrahydrofuran was weighed and heated to 50° C. With stirring, 30 g of ASA (EKA SA 200), 20 g of PEG-2000 and 20 g of stearic acid were added to tetrahydrofuran in sequence. About 100 g of lignin from enzymatic hydrolysis of biomass (commercially available from Shandong Longlive Bio-Technology Co., Ltd.) was added to the mixture and the mixture was heated to 75° C. After 20 minutes, the mixture was ready for use.

Urea granules were put into a sieve of 150-mesh. The sieve with urea granules (50 g of urea granules produced by Ruixing Group Co., Ltd) were then immerged into the previously prepared 470 g of coating mixture for 3 seconds. The sieve was then taken out and the urea granules were transferred to a shaking plate (Model: S-101. Produced by Firstek Scientific Co., Ltd.). Hot air of 40-60° C. with a pressure of 2-3 bar was blown onto the working shaking plate for 30-60 seconds to dry the granules and remove the solvent. The granules were then transferred to the sieve, and immerged into the coating mixture and then dried with hot air of 40-60° C. The immerging and drying steps were repeated 3 times. After the last drying of the coating mixture, the granules, finally coated with 95 g of the dry coating mixture, were immerged in ASA (EKA SA 200) for 1-3 seconds to gain a weight of 2 g, and then were put into kaolin powder to adsorb 5 g kaolin powder. Finally, the coating materials were 67% by weight of the whole granules.

The coating materials mean the materials on the granules, i.e. ASA, PEG-2000, stearic acid, lignin and Kaolin powder.

Figure 2:
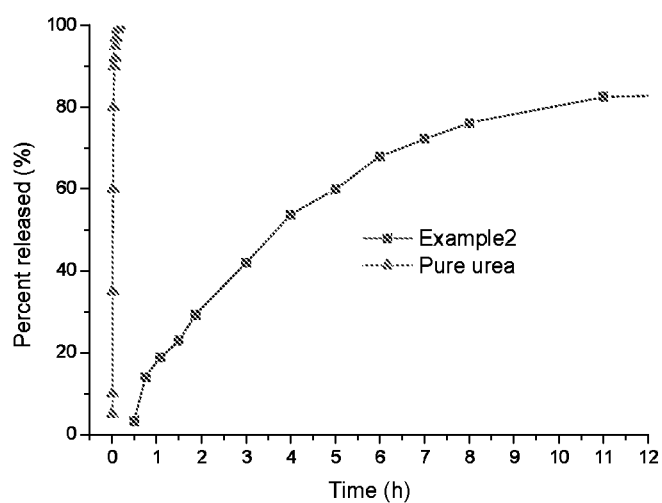
FIG. 2 shows the release profile of slow release fertilizer from example 2 compared to pure urea.

The results of Example 2 are shown in FIG. 2. Pure urea totally dissolves in water in 6 minutes.

Example 3

Figure 3:
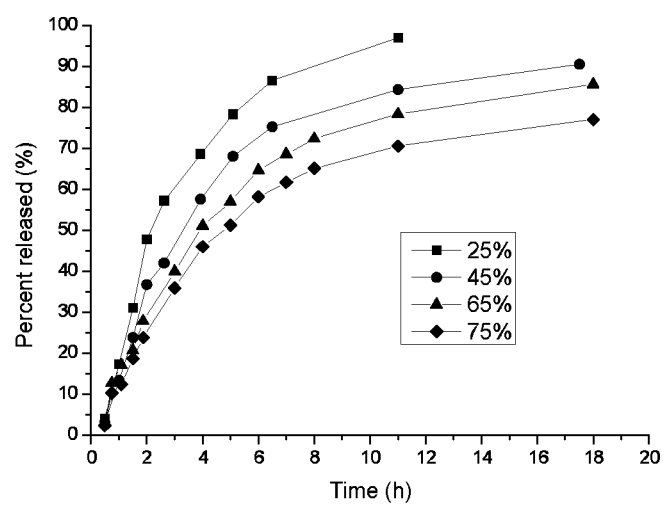
FIG. 3 shows the release profile of slow release fertilizers with different coating weights.

With the same formulation as Example 2, different coating weights were achieved (The different coating weights were achieved by varying the immerging and drying times of Example 2. One cycle of immerging and drying led to 2.5% of total coating weight, while two, three, and four cycles of immerging and drying led to 45%, 65% and 75% of coating weights, respectively). The nutrient release was evaluated as shown in FIG. 3.

It should be appreciated that, in the above description, those skilled in the art could make a variety of changes or modifications to the embodiments and aspects, and these equivalents would still be within the scope of the embodiments and aspects defined by the appended claims of the application.

What is claimed is:
1. A method for preparing a slow-release fertilizer comprising the steps of:
 a) dissolving lignin compounds, alkenylsuccinic anhydride, stearic acid and PEG-2000 in a solvent heated to 50-100° C.;
 b) forming a coating on the surface of urea granules using the solution obtained in step a) and drying;
 c) immersing the coated granules obtained in step b) in alkenylsuccinic anhydride;
 d) adsorbing kaolin onto the surface of the coated granules, wherein the coating materials are 20-80% of the total weight of the coated granules.
2. The method of claim 1, wherein:
 30 to 70 parts by weight of the lignin compounds, 5 to 10 parts by weight of alkenylsuccinic anhydride, 5 to 15 parts by weight of stearic acid and 5 to 15 parts by weight of PEG-2000 are dissolved in the solvent heated to 50-100° C.;
 2 to 10 parts by weight of alkenylsuccinic anhydride are absorbed onto the coated granules; and
 2 to 10 parts by weight of kaolin are adsorbed onto the surface of the coated granules.
3. The method of claim 1, wherein the solvent is selected from 1,4-dioxane, tetrahydrofuran, N,N-dimethylformamide, ethanol, methanol, hexane dimethylsulfoxide, 2-methoxyethanol or the mixture thereof.
4. The method of claim 1, wherein the lignin compounds have a lignin content higher than 80% and a weight average molecular weight more than 1500 g/mol.
5. The method of claim 1, wherein the solvent to lignin compounds ratio by weight is from 3:1 to 7:1.
6. The method of claim 1, wherein the drying is done at temperature in a range from 40° C. to the boiling point of the solvent.
7. The method of claim 1, wherein the drying is done at 40-60° C. at a pressure of 10-101 KPa.
8. The method of claim 1, wherein forming the coating on the surface of the urea granules is achieved by immersing the urea granules in the solution obtained in step a) or by spraying the solution obtained in step a) on the surface of the urea granules.
9. A formulation of a coating material comprising 30-70% by weight of the lignin compounds, 10-25% by weight of alkenylsuccinic anhydride, 5-20% by weight of stearic acid, 5-15% by weight of polyethylene glycol PEG2000 and 2-15% by weight of kaolin, wherein all the weight percentages are based on a total weight of the coating material.
10. The formulation of claim 9, wherein the alkenylsuccinic anhyrdide has a linear alkenyl chain of 14 to 20 carbon atoms.
11. A fertilizer obtained by the method in claim 1.
12. The method claim 1, wherein the drying is done with hot air of 40-60° C. with pressure of 1-7 bar.
13. The method of claim 1, wherein the alkenylsuccinic anhydride has a linear alkenyl chain of 14 to 20 carbon atoms.

* * * * *